March 3, 1936.         G. ARSNEAU         2,032,609
CHAIN SAW UNIT
Original Filed Nov. 15, 1933    3 Sheets-Sheet 1
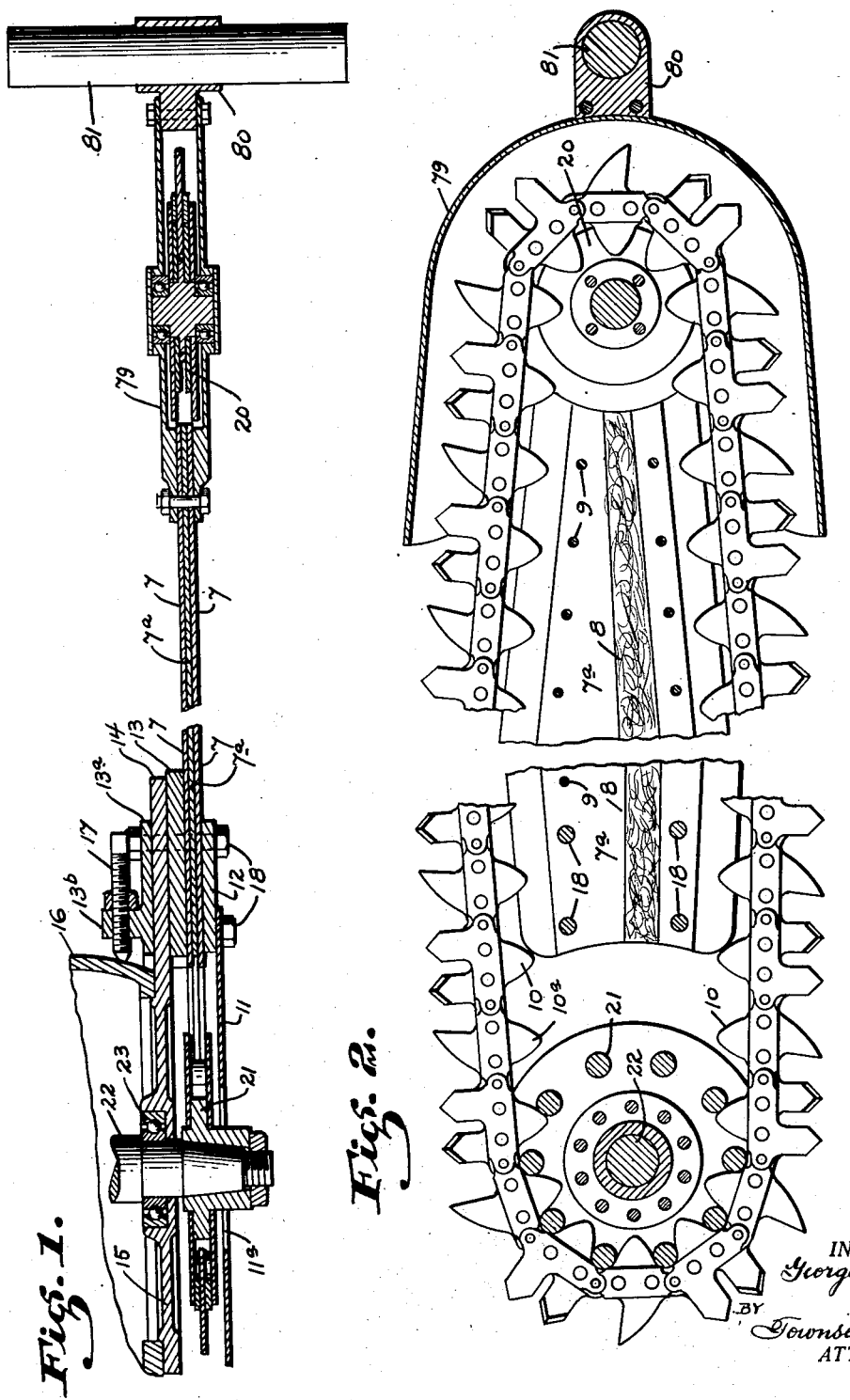
INVENTOR.
George Arsneau.
BY Townsend & Loftus
ATTORNEYS.

March 3, 1936. G. ARSNEAU 2,032,609
CHAIN SAW UNIT
Original Filed Nov. 15, 1933 3 Sheets-Sheet 2

INVENTOR.
George Arsneau.
BY Townsend & Loftus
ATTORNEYS.

March 3, 1936.   G. ARSNEAU   2,032,609
CHAIN SAW UNIT
Original Filed Nov. 15, 1933   3 Sheets-Sheet 3

INVENTOR.
George Arsneau.
BY Townsend & Loftis
ATTORNEYS.

Patented Mar. 3, 1936

2,032,609

UNITED STATES PATENT OFFICE 2,032,609

CHAIN SAW UNIT

George Arsneau, Los Angeles, Calif., assignor, by mesne assignments, to Dow Power Saw Company, a corporation of California Original application November 15, 1933, Serial No. 698,186. Divided and this application January 30, 1934, Serial No. 708,983

1 Claim. (Cl. 143—32)

This application is a division of my copending application entitled Power saws, filed Nov. 15, 1933, Ser. No. 698,186.

This invention relates to sawing machines and more particularly to a chain saw unit.

It is the object of the present invention to provide a chain saw unit for use in sawing machines of the general character described in my copending application above referred to that is simple and rugged in construction; that will be effectively lubricated by a novel built-in lubricating system; that will include safety means for protection of the operator and means for adjusting the tension on the chain saw.

One form which the invention may assume is exemplified in the following description and illustrated by way of example in the accompanying drawings, in which:

Fig. 1 is a section taken on a horizontal plane through the chain saw unit.

Fig. 2 is a view partly in vertical section and partly in elevation of certain of the parts shown in Fig. 1.

Figure 3:
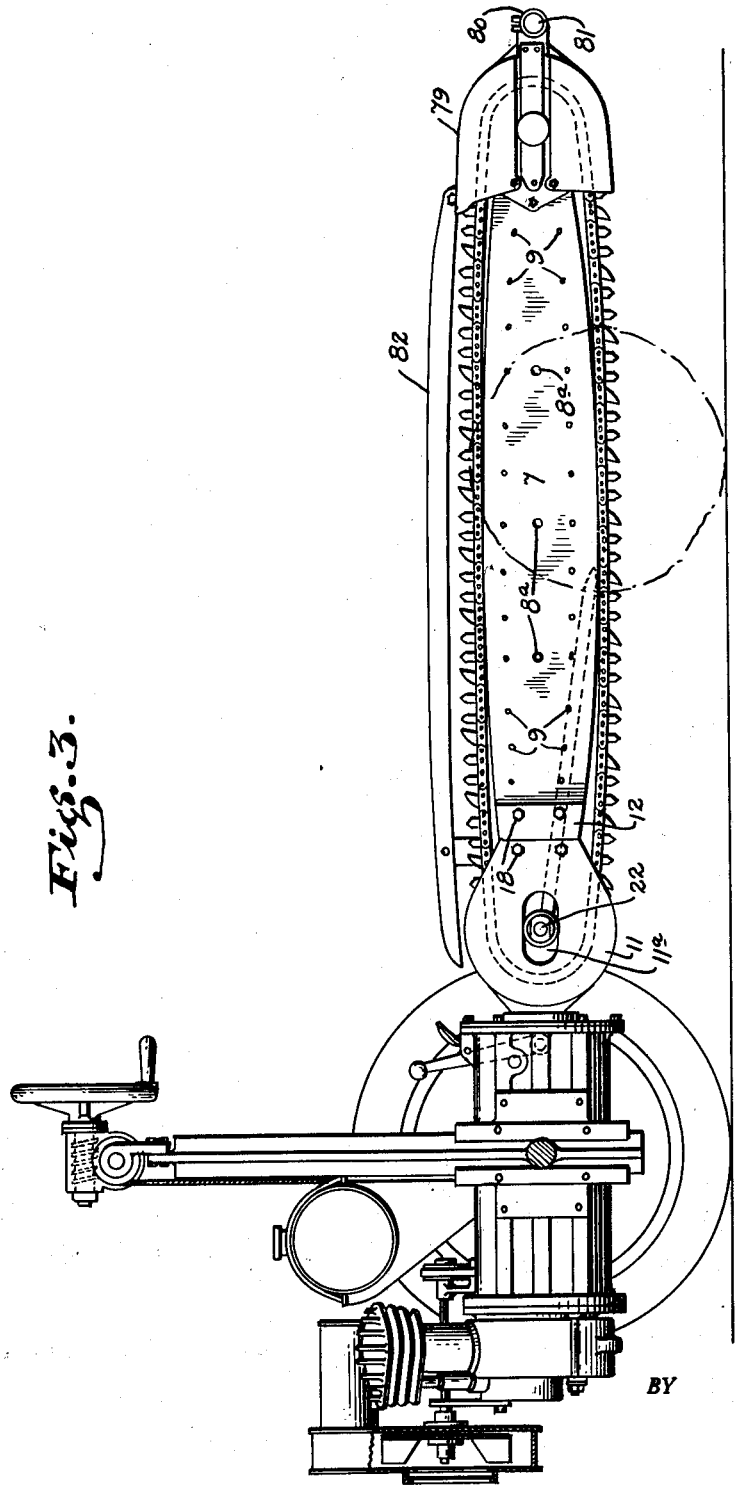
Fig. 3 is a side view in elevation of a complete sawing machine with parts broken away and parts in section.
Figure 4:
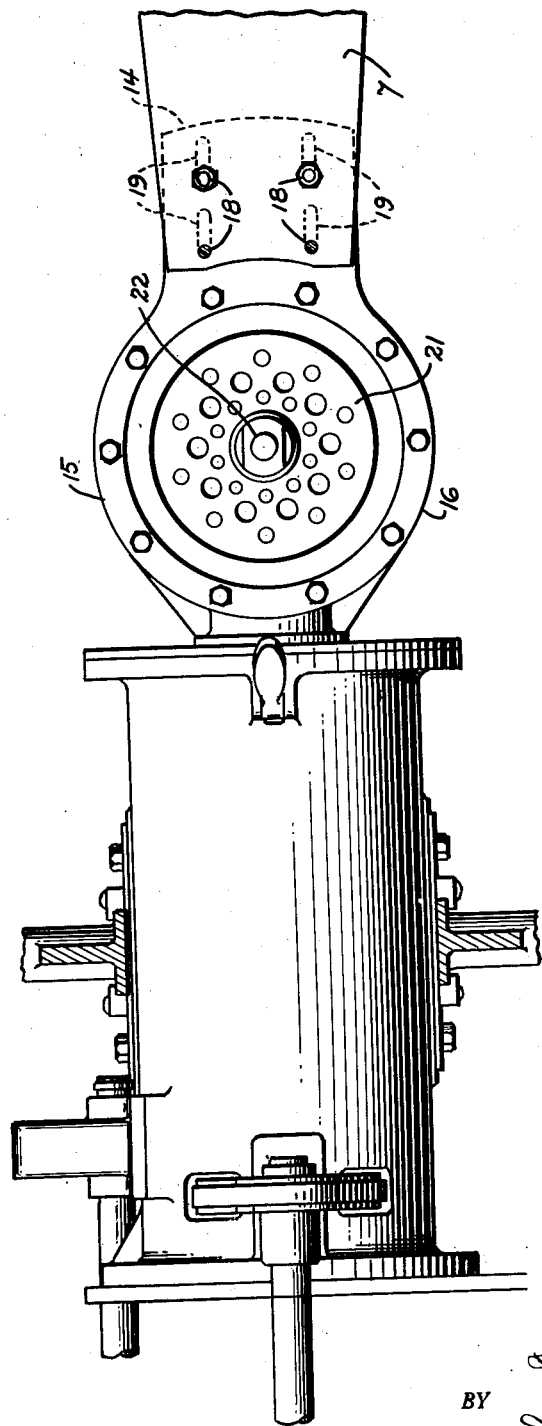
Fig. 4 is a fragmentary view in elevation on an enlarged scale with parts in section illustrating the manner of mounting the unit to the housing by means of which it is supported.

Referring more particularly to the drawings, the chain saw unit comprises a rigid frame structure which includes companion plates 7—7 having interposed therebetween filler plates 7a—7a and a longitudinal wick 8, such as a strip of felt or like porous material, the plates 7—7 and 7a—7a being riveted together at 9 or otherwise connected with each other in a suitable well-known manner. This construction is such that a lubricant holder is formed between said plates for the retention of lubricant. For this reason, the plates are formed with supply perforations 8a into which the nozzle of a lubricant container or force feed gun (not shown) may be introduced and lubricant supplied to the wick to a point of oversaturation thereof, whereby there will exist a tendency of the lubricant to seek egress towards the open side of the saw-carrying frame. Now, it will be observed that the chain saw has its sprocket teeth 10 and 10a disposed to operate in the space between said plates 7—7 as the saw operates over a regularly defined course and in so doing, lubricant will be collected thereby. It is thus proposed that the cutting edge of the saw shall be maintained constantly in a well lubricated condition.

Forming a part of the frame structure of the saw unit is a cheek plate 11, filler plate 12, sliding means 13—13a, and an extension 14 formed on the cover plate 15 of a gear housing 16. The sliding means 13a carries a fixed lug 13b in which a screw 17 is mounted so as to engage at one of its ends against an adjacent wall of the gear housing. Passing through the plate 12 and mounted to move with the means 13 are clamping bolts 18, the latter passing through the longitudinal guide slots 19 in the extension 14 of the housing plate 15. It follows that when the bolts 18 are loosened, movement in a longitudinal direction can be imparted to the frame of the saw assembly. The structural features just referred to largely make up the saw tensioning means. The saw is trained over an idler 20 at the front of the frame of the saw assembly and over a sprocket gear 21 on a driven spindle 22, the latter passing through a longitudinal slot 11a in the plate 11 and journaled in a bearing 23 carried by the housing head 15 and in a similar bearing (not shown) carried by the opposite head 25 of said housing. Because of this manner of mounting the spindle 22, it will be appreciated that when longitudinal movement is imparted to the frame structure of the saw assembly, the idler 20 will move relatively to the sprocket gear 21, whereby to enable the chain saw to be readily tensioned when the exigency therefor arises.

At the front or operator's end of the saw assembly is a hand and body guard 79 which constitutes a part of the saw-carrying frame of said assembly, and same passes over the saw to approximately the extent illustrated clearly in Figure 2 and with ample clearance between the inner walls of said guard and the cutting edge of the saw. A tubular member 80 at said operator's end of the saw frame accommodates a hand grip 81 in the form of a transverse bar, it being intended that it be used when moving the saw frame on its fulcrum, as well as when (1) angularly adjusting the frame to assume a predetermined position, or (2) when transporting the machine from one place to another or when adjusting the machine to the work. A guard member 82 is supported by the frame of the saw assembly and same occupies a position to protect one against injury by contact with the cutting edge of the saw. It is thus manifest that all of the saw except the part thereof which of necessity must be exposed for duty is concealed in a manner that will reduce the possibility of injury to the person of the operator or persons standing in close proximity to the saw to a reasonable minimum.

Having thus described my invention, what I claim and desire to secure by Letters Patent is:

In a sawing machine, a frame, an idler at one end of the frame, a gear housing, a cover plate on said housing having an extension formed thereon, a sliding connection between the other end of said frame and said extension, a driven shaft extending through said cover plate, a sprocket gear secured to the outer end of said shaft, a chain saw trained over the idler and over said sprocket gear, an adjusting screw carried by the frame adjacent said sliding connection and bearing against the gear housing to move the frame and vary the tension on the saw, and clamping means for retaining said sliding connection in adjusted position.

GEORGE ARSNEAU.